(12) United States Patent
Dent

(10) Patent No.: US 6,680,928 B1
(45) Date of Patent: Jan. 20, 2004

(54) COMMUNICATIONS SYSTEM AND METHOD FOR MULTI-CARRIER ORTHOGONAL CODING

(75) Inventor: Paul W. Dent, Pittsboro, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/340,907

(22) Filed: Jun. 28, 1999

Related U.S. Application Data

(63) Continuation-in-part of application No. 09/082,722, filed on May 21, 1998, and a continuation-in-part of application No. 08/898,392, filed on Jul. 22, 1997.

(51) Int. Cl.$^7$ ............................................... H04B 7/212
(52) U.S. Cl. ...................... 370/342; 370/208; 370/335; 455/63
(58) Field of Search ............................. 455/63; 370/208, 370/209, 328, 329, 335, 342, 330, 343

(56) References Cited

U.S. PATENT DOCUMENTS

| | | | | |
|---|---|---|---|---|
| 4,296,374 A | | 10/1981 | Henry | ........................ 324/77 |
| 6,144,694 A | * | 11/2000 | Uta et al. | ................... 375/146 |
| 6,173,005 B1 | * | 1/2001 | Kotzin et al. | ............... 375/141 |
| 6,246,698 B1 | * | 6/2001 | Kumar | ....................... 370/487 |
| 6,356,555 B1 | * | 3/2002 | Rakib et al. | ................ 370/441 |
| 6,359,864 B1 | * | 3/2002 | Yoshida et al. | ............. 370/318 |
| 6,381,233 B1 | * | 4/2002 | Sunaga | ....................... 370/335 |
| 6,473,449 B1 | * | 10/2002 | Cafarella et al. | ........... 375/141 |

FOREIGN PATENT DOCUMENTS

| | | | | |
|---|---|---|---|---|
| EP | 0837565 | | 4/1999 | ............ H04B/1/69 |
| EP | 0929161 | | 7/1999 | ............ H04B/7/06 |

* cited by examiner

*Primary Examiner*—William Trost
*Assistant Examiner*—Danh C Le
(74) *Attorney, Agent, or Firm*—Myers Bigel Sibley & Sajovec

(57) ABSTRACT

In CDMA systems, a message to be transmitted is redundantly coded for transmission using a combination of error-correction coding and a spread-spectrum access code. The coded message is modulated to a first radio frequency channel, or band, and also to at least one other frequency channel, which may be either an adjacent or a non-adjacent channel. Other messages for transmission are generated likewise and the signals for transmission on the first channel are summed using a set of weighting factors, with the weighted sum transmitted on the first channel. The same signals are summed for transmission on the at least one other frequency channel, but using weighting factors that have a progressive relative phase rotation compared to their Values on the first channel. The sequence of weighting factors used for one signal across the different frequency channels is preferably orthogonal to the sequence of weighting factors used for a different signal.

37 Claims, 9 Drawing Sheets

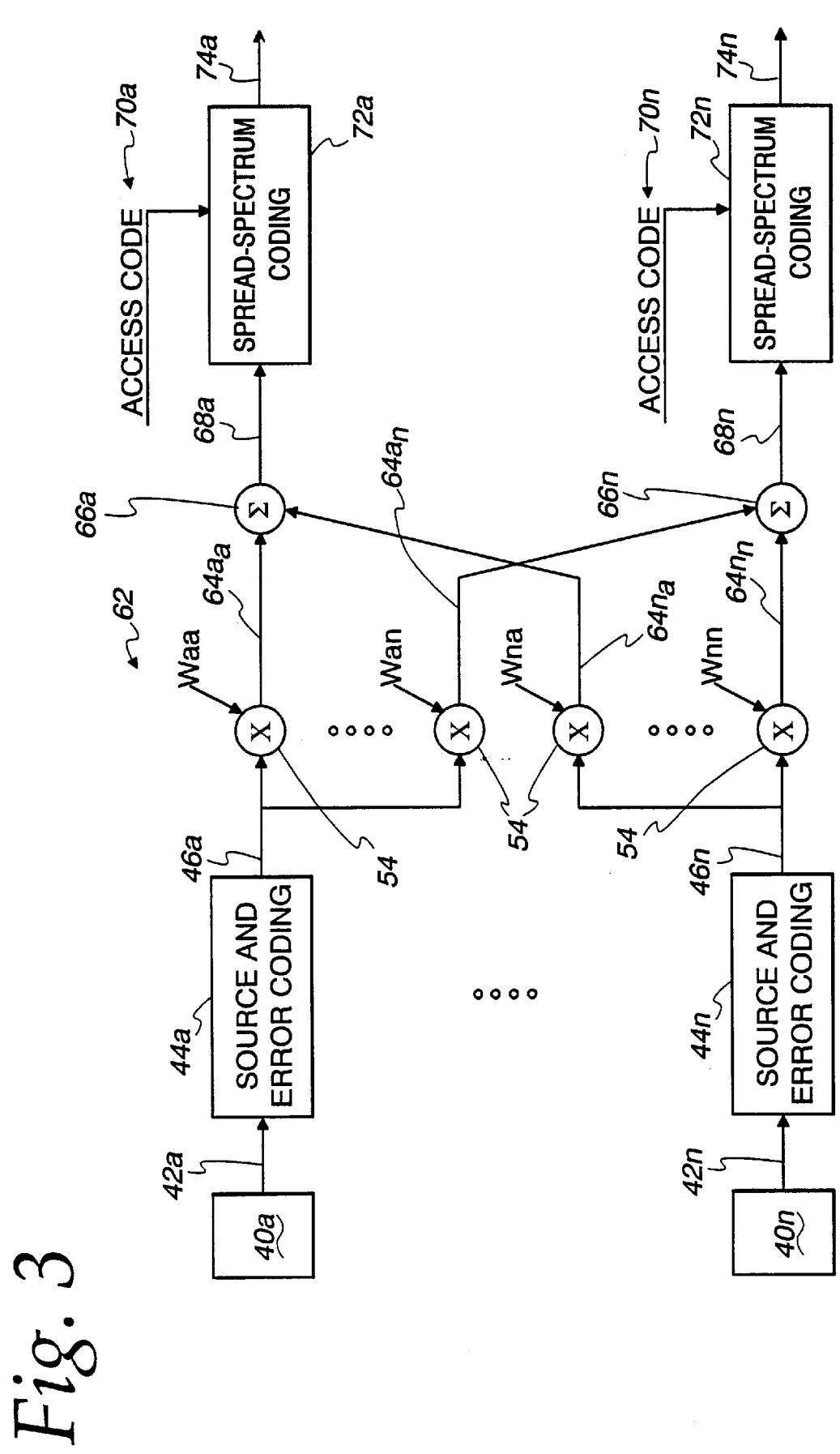

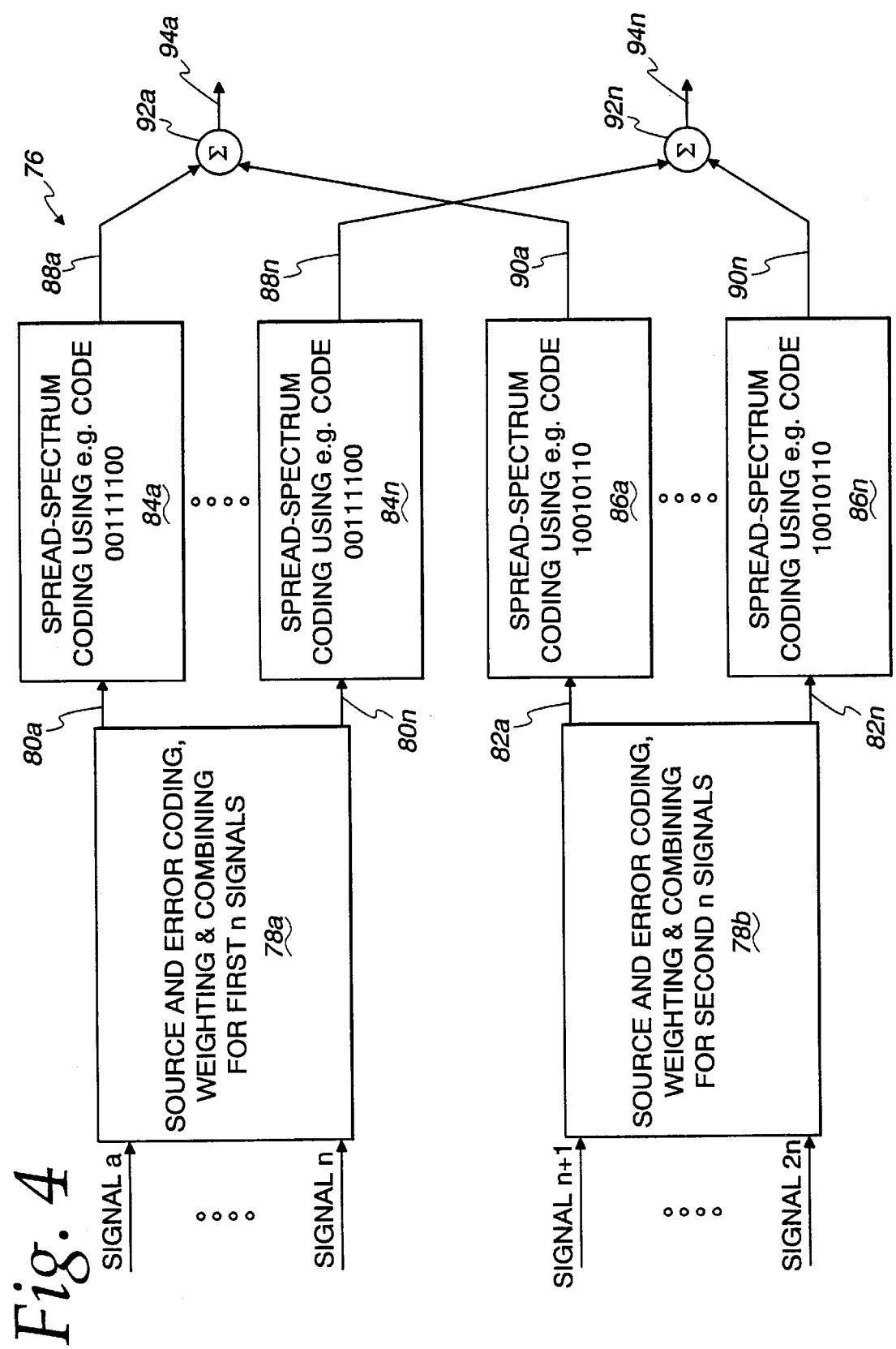

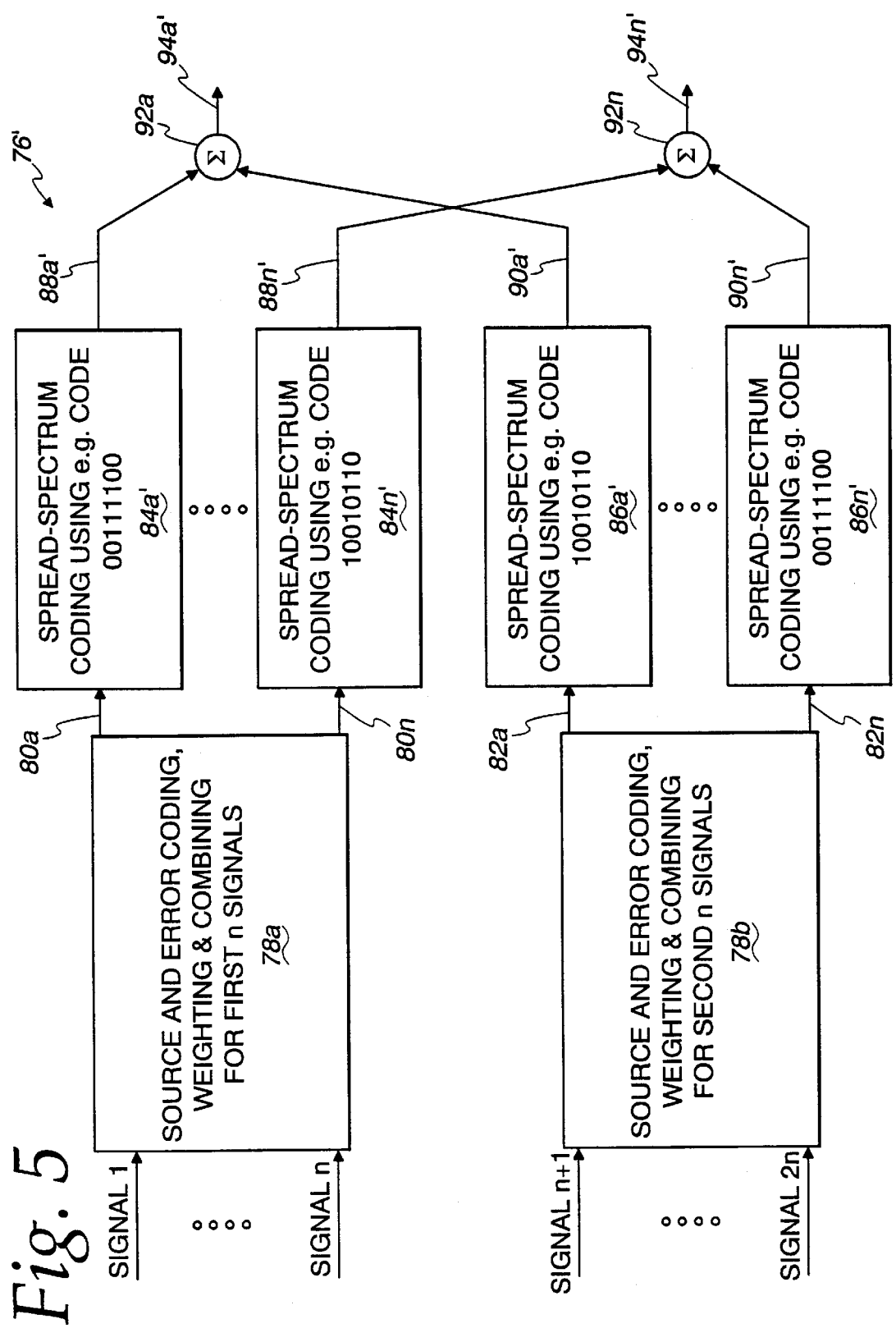

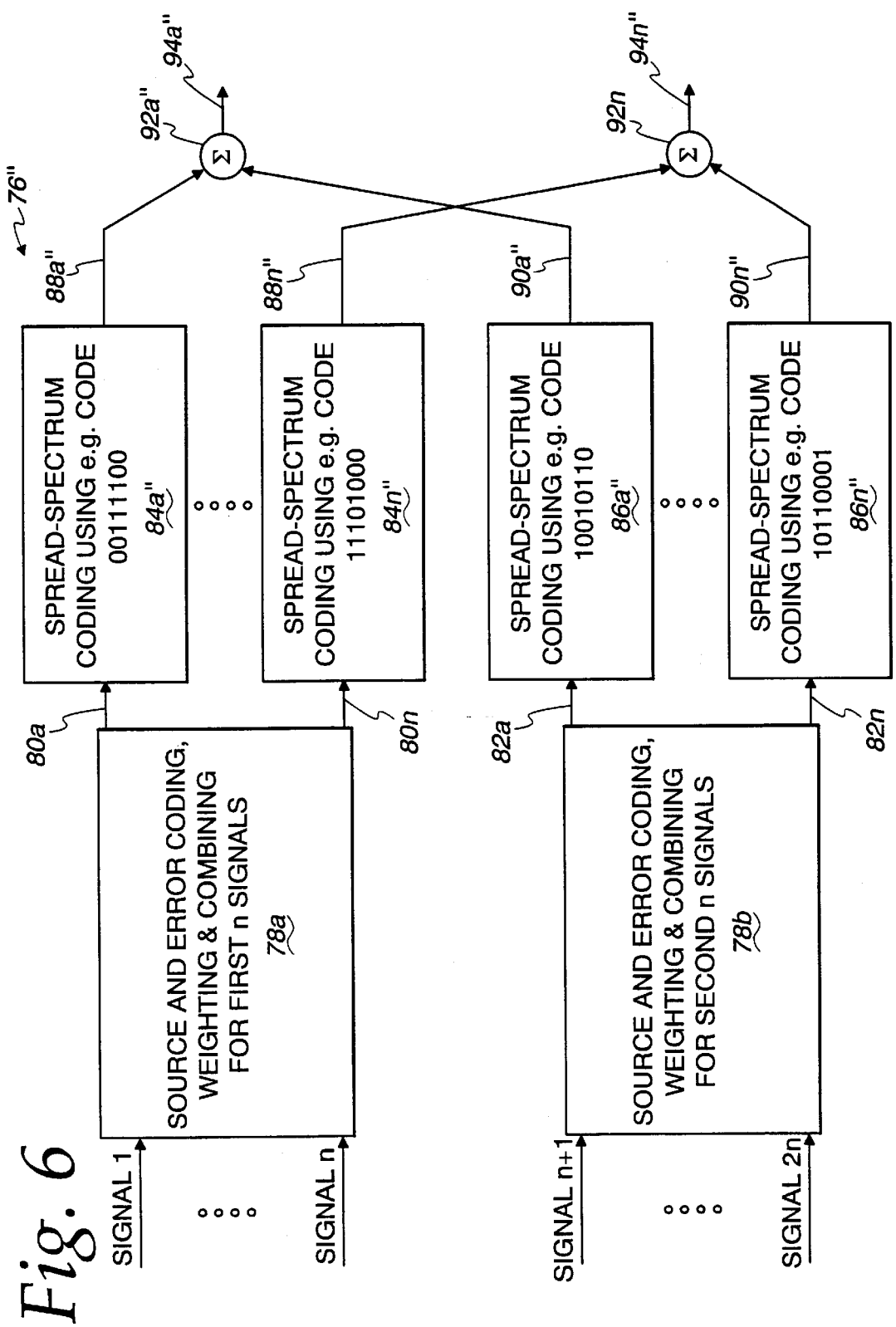

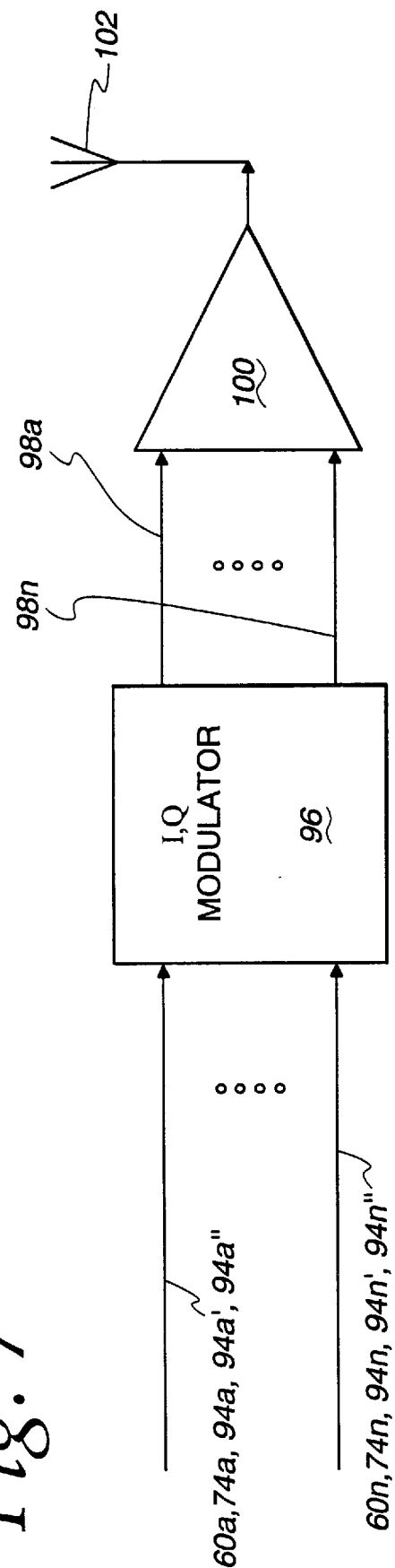

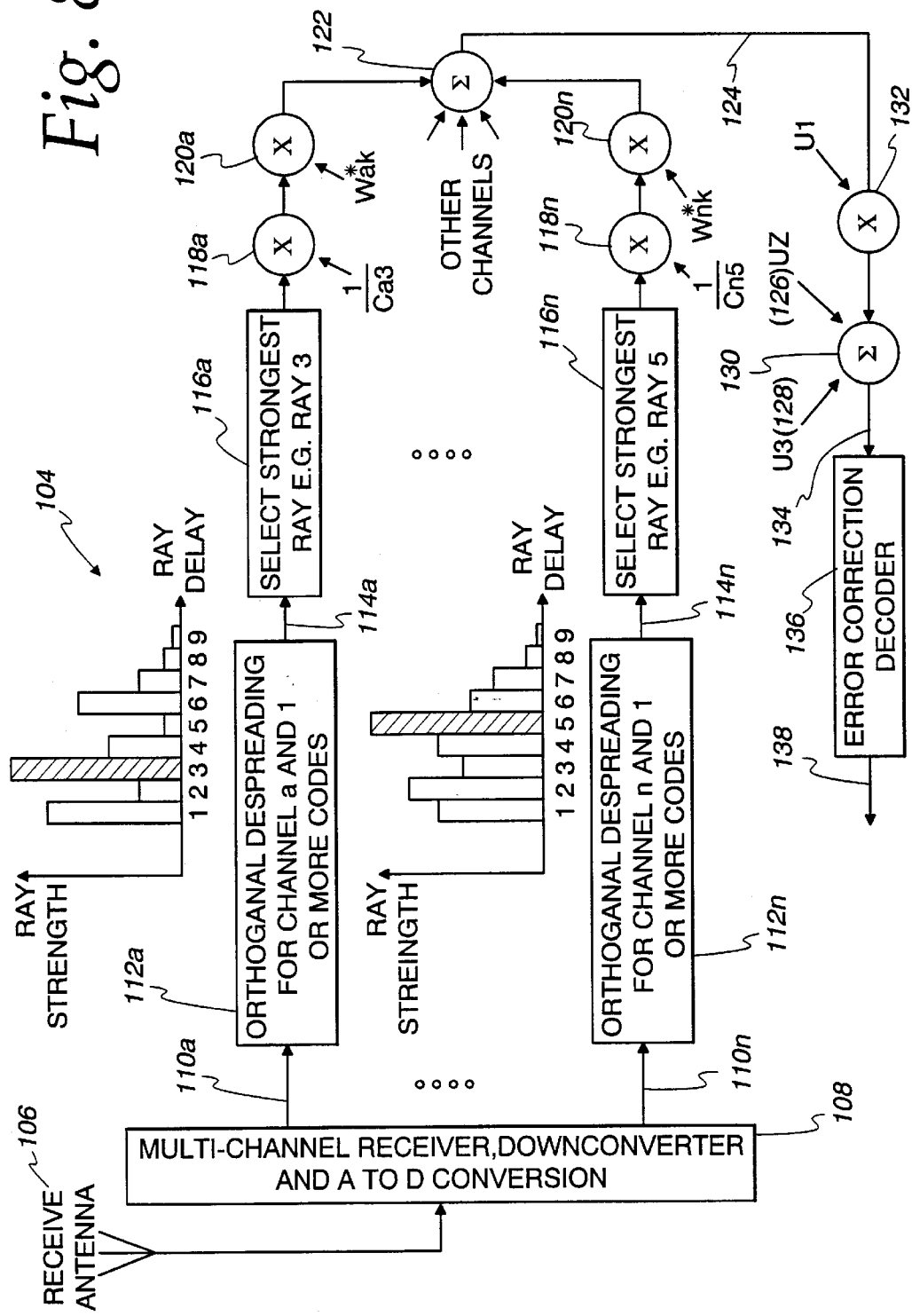

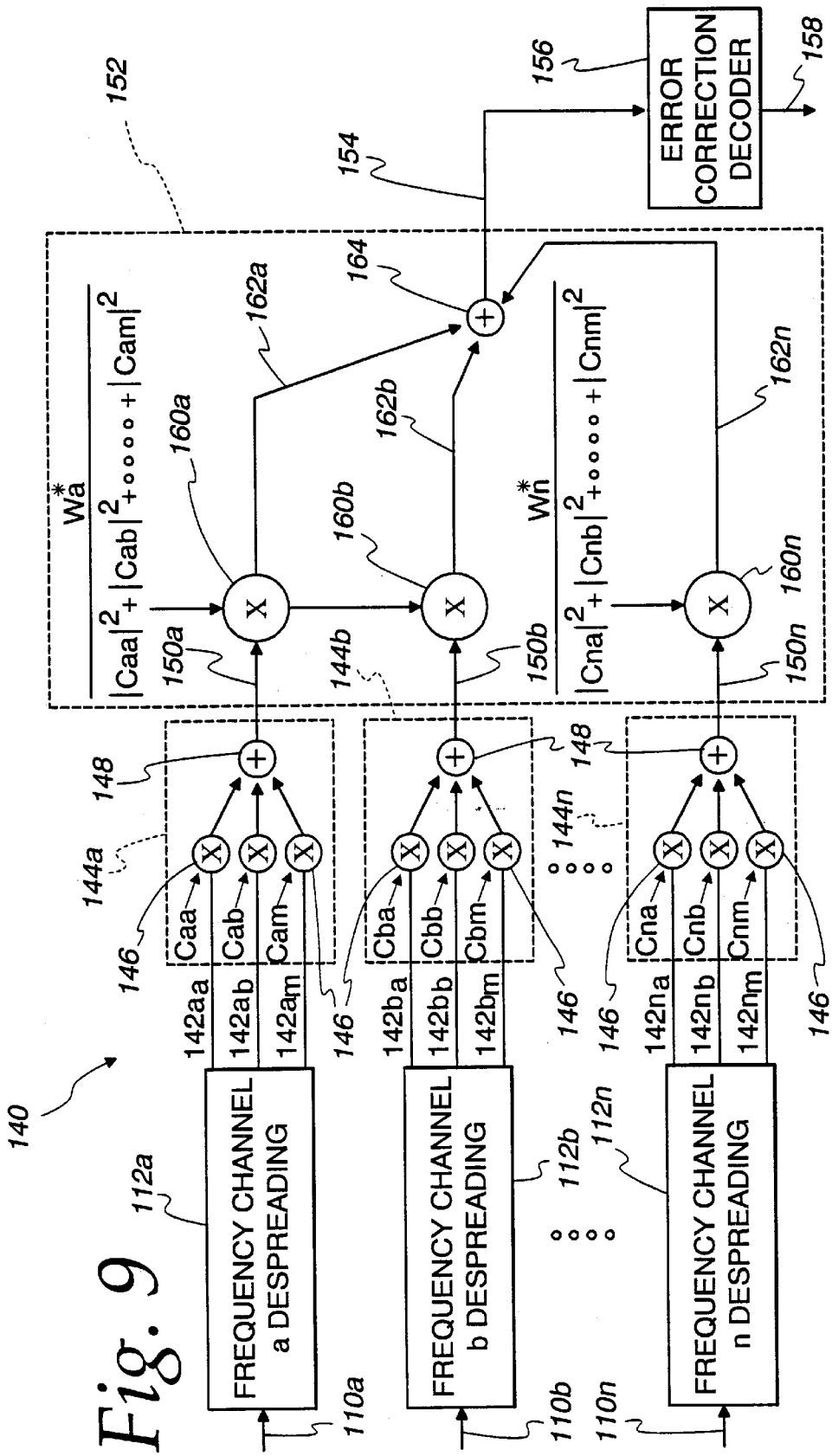

COMMUNICATIONS SYSTEM AND METHOD FOR MULTI-CARRIER ORTHOGONAL CODING

CROSS-REFERENCE TO RELATED APPLICATIONS

This application is a continuation-in-part of U.S. patent application Ser. No. 08/898,392 to Dent, filed Jul. 22, 1997 and entitled "Communication System and Method with Orthogonal Block Encoding" and Ser. No. 09/082,722 to Dent, filed May 21, 1998 and entitled "Partially Block-Interleaved CDMA Coding and Decoding", both of which are pending.

FIELD OF THE INVENTION

The present invention is directed toward spread-spectrum radio communications systems that transmit messages with large amounts of redundant coding to provide discrimination of one signal from overlapping signals and, more particularly, toward improved orthogonal coding techniques for coding messages over more than one channel, for example, when the message is spread over more than one frequency channel as in multi-carrier CDMA (Code Division Multiple Access) systems.

BACKGROUND OF THE INVENTION

FIG. 1 illustrates a prior art orthogonal transmitter, shown generally at including a plurality of information sources $12a-n$ generating information signals $14a-n$, which are received by respective source and error coding units or coders $16a-n$. The source and error coding units $16a-n$ conventionally source and error code the received information signals $14a-n$, producing digitally coded information streams $18a-n$. Source coding involves converting information to digital form, for example, Analog to Digital conversion of speech, and optionally compressing the digital information using a compression algorithm adapted to the particular type of information, such as speech, FAX, images, etc. Error coding involves expanding the source coded digital data by adding redundancy which enables errors to be corrected and/or detected by a receiver. If desired, the source and error coding units $16a-n$ may also encrypt the coded information using a key unique to each information source $12a-n$.

In FDMA (Frequency Division Multiple Access) systems, each digitally coded information stream $18a-n$ from the coders $16a-n$ is modulated onto a respective frequency channel. Sufficient channel spacing is chosen such that signals on neighboring frequency channels do not interfere with one another and are easily distinguishable by receiver filters. Typically, the channel spacing is slightly greater than the spectral occupancy of the transmitted signal, the excess being regarded as a "guard band" in the frequency plane to allow for factors such as frequency error, etc.

In TDMA (Time Division Multiple Access) systems, each digitally coded information stream $18a-n$ from the coders $16a-n$ is modulated onto a respective radio frequency channel in a respective timeslot of a TDMA frame period. The use of a small guard time between timeslots ensures that signals in different timeslots do not interfere with one another even when delayed echos of the transmitted signal are received due to multi-path propagation. However, to ensure non-interference between signals, the echo delay must not be greater than the guard time between timeslots.

The non-interference property between different channels of an FDMA system, or different timeslots of a TDMA system, is typically referred to as "orthogonality" between channels. In FDMA and TDMA systems, orthogonality is maintained during signal propagation from the transmitter to the receiver, i.e., unaffected by multi-path propagation, so long as the necessary interslot guard times are utilized. In TDMA systems, the information source signals are multiplexed together and modulated at a higher bitrate onto a carrier. The multiplexed/modulated signal is demodulated by a receiver using an equalizer to compensate for multi-path propagation. The demodulated bits are then partitioned into the different original source information streams. This also represents orthogonality between channels even though no intra-timeslot guard time is used.

In direct-sequence spread-spectrum systems, also known as CDMA systems (see FIG. 1), each digitally coded information stream $18a-n$ from the coders $16a-n$ is combined in spread-spectrum coders $20a-n$ with a respective access code $22a-n$ that expands the symbol rate of the information stream $18a-n$ by an amount known as the spreading factor. The symbols, or modulation intervals, of the expanded signal are commonly known as chips, and there are usually an integer number of chips produced for each digitally coded symbol from the coders $16a-n$, with the number of chips per symbol equal to the spreading factor.

In orthogonal CDMA systems, the access codes $22a-n$ with which the digitally coded information streams $18a-n$ are combined are mutually orthogonal to each other and jointly form a set of orthogonal codes. When the spreading factor is equal to a power of two, a suitable set of orthogonal access codes are the Walsh-Hada-mard codes, i.e., Walsh codes. FIG. 1 illustrates 8-bit Walsh codes $22a-n$ that may be used when the spreading factor is equal to eight. The Walsh codes $22a-n$ are orthogonal since between any two codes, half of the bits are the same and the other half are of opposite polarity. This results in the cross-correlation between any two different codes being theoretically zero. It should be noted that since code 11111111 is illustrated for code $22a$, the code 00000000 would not be a part of the Walsh-Hada-mard code sequence, since orthogonality between codes would not be sustained. Further, orthogonality is maintained only if the Walsh codes are exactly time-aligned. Time-misaligned codes are not necessarily orthogonal to each other. Therefore, a delayed echo of one code received due to multi-path propagation is not generally orthogonal to the other undelayed codes, resulting in unwanted interference.

The present invention is directed toward overcoming one or more of the above-mentioned problems.

SUMMARY OF THE INVENTION

In CDMA systems, a message to be transmitted is redundantly coded for transmission using a combination of error-correction coding and a spread-spectrum access code. The coded message is modulated to a first radio frequency channel, or band, and also to at least one other frequency channel, which may be either an adjacent or a non-adjacent channel. Other messages for transmission are generated likewise and the signals for transmission on the first channel are summed using a set of weighting factors, with the weighted sum transmitted on the first channel. The same signals are summed for transmission on the at least one other frequency channel, but using weighting factors that have a progressive relative phase rotation compared to their values on the first channel. The sequence of weighting factors used for one signal across the different frequency channels is preferably orthogonal to the sequence of weighting factors used for a different signal. For example, the Fourier sequences described by $$Wik = \exp(2\pi ik/n)$$

may be used, where "n" is the number of channels utilized for transmission, "i" is the index of the channel, and "k" is the index of the signal being weighted.

In the special case of n equal to a power of two, the weighting factor sequences may instead be Walsh codes. In this case, a decision whether to invert the signal "k" in channel "i" is determined according to the polarity of the i'th bit of the n-bit Walsh code W(k).

When n is composite and equal to the product of factors n1, n2, n3, . . . , nm, hybrid Walsh-Fourier sequences may be used for the weighting factor sequences, corresponding to an m-dimensional Walsh-Fourier transform, with the option of using the simpler Walsh sequences in dimensions corresponding to a factor of n which is a power of two. Thus, orthogonal sequence sets of any length may be constructed.

When the number of signals to be transmitted is greater than the number of orthogonal functions, i.e., weighting factors, in the set, the signals are divided into a number of groups less than or equal to the number of orthogonal functions in the set. All signals in the same group are then summed for the same frequency channel using the same weighting factors. Different signals within each group may be discriminated by using a set of access or spreading codes that are orthogonal within each frequency channel. Different groups of signals may use, within themselves, the same orthogonal spreading codes, but modified preferably using a Bent sequence for each group that provides maximum differentiation from the codes of other signal groups.

A receiver for receiving and processing the inventive signal construction described above includes multiple receiver channels for receiving signals on the n channels. Multiple channel estimation means estimates, for each channel, the phase and amplitude of each of a number of multiple, delayed propagation paths by which the signal reached the receiver from the transmitter. Each different path taken by the signal is referred to as a ray. To decode a particular signal, the signal received in each channel is first despread using a within-channel spreading code (access code) assigned to that signal to obtain a despread signal, or ray, from each channel for each time-delayed path. Using the channel estimates, the largest of the multiple, delayed propagation paths, i.e., the strongest ray, for each channel is identified.

One despread signal from each channel corresponding to the strongest ray for each channel is then selected and combined by weighting and addition, using weights that are a function of the channel estimate for the respective ray and the weighting factor applied at the transmitter. The receiver weighting factor undoes the difference in phase shifts and attenuation between different channels, and undoes the phase shift of the weighting factor applied in the respective channel prior to transmission. The inventive receiver thus discriminates between signals within each group by means of the within-channel orthogonal codes, and discriminates between signals in different groups by means of the across-channel orthogonal codes.

The second strongest rays of each channel are then selected and combined similarly, and so on until all rays containing significant energy have been used. Each of the combined rays is further combined using a weighting factor for each ray that is a function of the channel estimates to reflect the combined signal-to-interference ratio of each ray. The final combined signal values are then used as soft information for an error-correction decoder to reproduce the originally transmitted information symbols.

In an alternate embodiment, a first signal decoded in the above manner is subtracted from the signal received in each channel, and the residual signals reprocessed to decode a second signal. This process continues iteratively, selecting signals preferably in order of signal strength highest to lowest until all desired signals are decoded.

Other aspects, objects and advantages of the present invention can be obtained from a study of the application, the drawings, and the appended claims.

BRIEF DESCRIPTION OF THE DRAWINGS

FIG. 3 shows a second implementation of the inventive signal converter;

FIG. 4 illustrates a third implementation of the inventive signal converter using both within-channel and across-channel orthogonal coding;

FIG. 5 illustrates an alternate variation of the third implementation of the inventive signal converter using both within-channel and across-channel orthogonal coding;

FIG. 6 illustrates a further variation of the third implementation of the inventive signal converter using both within-channel and across-channel orthogonal coding;

FIG. 7 is a block diagram of transmitter components for transmitting multi-channel spread-spectrum signals;

FIG. 8 is a block diagram of a receiver for receiving and processing multi-channel spread-spectrum signals; and FIG. 9 is a block diagram of an additional implementation of a receiver for receiving and processing multi-channel spread-spectrum signals.

DETAILED DESCRIPTION OF THE INVENTION

Figure 1:
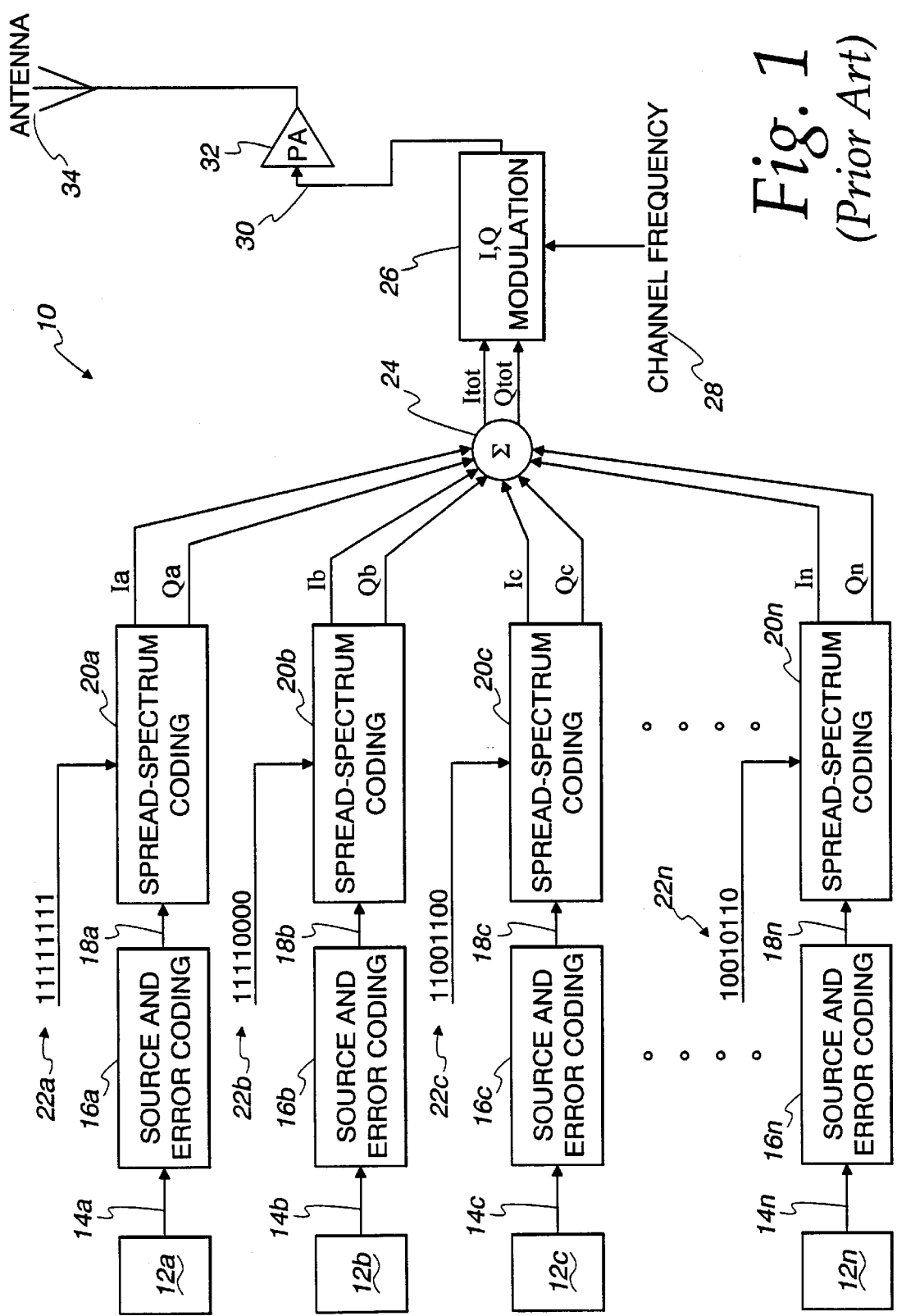
FIG. 1 is a block diagram of a prior art orthogonal CDMA transmitter.

In FIG. 1, which has been previously partially described, the spread-spectrum coded signals Ia,Qa; Ib,Qb; . . . ; In,Qn, with or without the use of orthogonal access codes 22a–n, are combined in a combiner 24. Each spread-spectrum coded signal is illustrated as a pair of signals I,Q which represent the real and imaginary signal waveforms after spread-spectrum coding. The signals Ia,Qa; Ib,Qb; . . . ; In,Qn may be digital sample sequences or continuous waveforms already filtered by a smoothing filter (not shown). The combiner 24 forms a weighted sum of the I (real) signals and a weighted sum of the Q (imaginary) signals to obtain a composite I,Q signal Itot,Qtot, which is applied to a modulator 26 along with a desired channel frequency signal 28 to produce a modulated signal 30. The modulated signal 30 is amplified to a desired transmit power level using a linear power amplifier 32, and then transmitted via antenna 34. The fraction of the total transmitted power allocated to each signal is controlled by choosing weighting factors for combining in the combiner 24, which factors may be dynamically altered by a power control algorithm in the combiner 24 using information on signal quality fed back from the receivers. In the U.S. CDMA cellular standard known as IS95, one of the signals is preferably a pure spread-spectrum code carrying no information, called the pilot code, and is used by the receivers to estimate the multi-path propagation coefficients that occur during transmission between the transmitter and the receiver. The prior art system of FIG. 1 does not preserve the orthogonality property of orthogonal codes under multi-path propagation.

Several methods of reducing the effects of such interference may be employed. U.S. patent application Ser. No. 08/898,392 to Dent, filed Jul. 22, 1997 and entitled "Communication System and Method with Orthogonal Block Encoding", describes a method of preserving orthogonality through multi-path channels based on transmitting chips in an interleaved order. U.S. patent application Ser. No. 09/082,722 to Dent, filed May 21, 1998 and entitled "Partially Block-Interleaved CDMA Coding and Decoding", further describes how such orthogonal coding could be employed to separate sub-groups of signals from one another, with the separation of signals within each subgroup being achieved by conventional means. The disclosures of the above applications are hereby incorporated by reference herein.

U.S. patent application Ser. No. 09/247,609 to Dent, filed Feb. 10, 1999 and entitled "Maximum Likelihood Rake Receiver for Use in a Code Division, Multiple Access Wireless Communication System" and U.S. patent application Ser. No. 09/227,180 to Dent, filed Jan. 7, 1999 and entitled "Smoothing Receiver Channel Estimates Using Spectral Estimation", describe methods of processing CDMA signals received by multi-path propagation, including the use of channel estimates and methods of estimating the same using pilot symbols and/or demodulated data symbols. The disclosures of the above applications are hereby incorporated by reference herein.

U.S. Pat. No. 5,790,549, issued to Dent on Aug. 4, 1998 and entitled "Subtractive Multicarrier CDMA Access Methods and Systems", describes how it can be advantageous to construct a wideband CDMA signal by juxtaposing several narrowband CDMA signals, resulting in reduced receiver complexity. The '549 patent is hereby incorporated by reference herein. While the signals spread over the multiple narrow bands in the '549 patent were not orthogonal, their interference effects upon each other were subtracted out by decoding the signals sequentially in order strongest to weakest.

The present invention discloses how to generate and receive multi-carrier CDMA signals in which a high proportion of the interference is orthogonal and removed with receivers of reduced complexity. For additional performance gains, the technique of interference subtraction may be incorporated as well.

Figure 2:
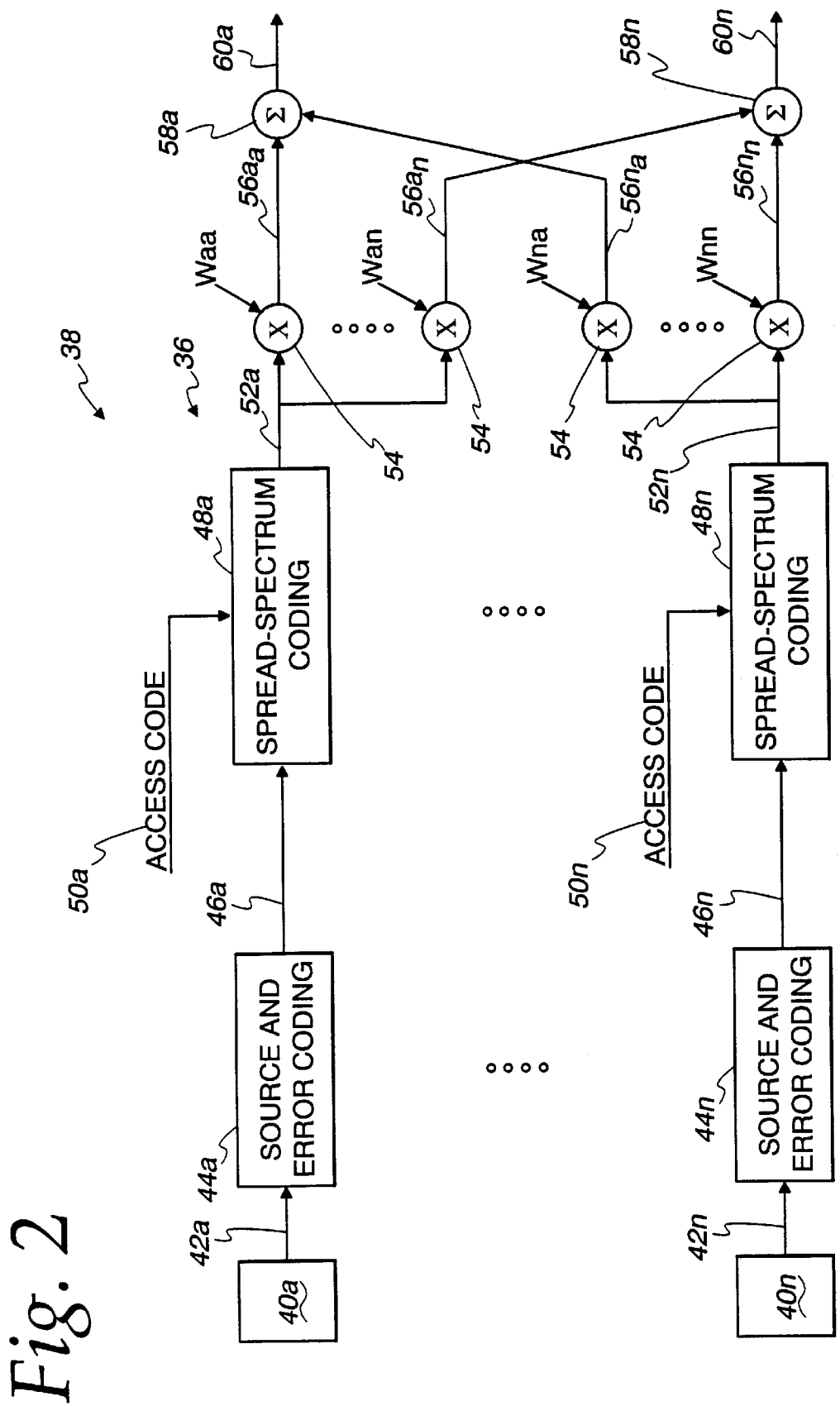
FIG. 2 illustrates a first implementation of the inventive signal converter.

FIG. 2 illustrates signal converter, shown generally at 36, which may be used in a multi-channel orthogonal CDMA transmitter, shown generally at 38. The signal converter 36 includes a plurality of information sources 40a–n generating information signals 42a–n, which are received by respective source and error coding unit 44a–n. The source and error coding units 44a–n suitably source and error code the received information signals 42a–n, producing digitally coded information streams 46a–n. Each digitally coded information stream 46a–n is combined in spread-spectrum coders 48a–n with a respective access code 50a–n that expands the symbol rate of the information stream 46a–n, producing spread-spectrum coded signals 52a–n. While the spread-spectrum coded signals 52a–n are illustrated with a single line, it should be understood that they are complex-valued signals having a real (I) component and an imaginary (Q) component. Each coded information signal 46a–n can use the same access codes, alternatively different non-orthogonal access codes, or different, orthogonal access codes. Each spread-spectrum coded signal index "i" is then multiplicatively weighted with weighting factors Wik by weighting multipliers 54 to produce a signal for each channel "k", where "k" ranges from 1 to the maximum number of channels "n".

For example, the spread-spectrum coded signal 52a is multiplied by weighting factors Waa to Wan by multipliers 54, producing n weighted information signals $56a_{a-n}$. The other spread-spectrum coded signals 52b–n are multiplicatively weighted in the same manner, with each signal developed into n respective weighted information signals. The original information signals 42a–n are then spread across each frequency channel by feeding one of the weighted information signals to each of a respective combiner 58a–n associated with each of the n frequency channels. For example, each of the weighted information signals $56a_a$, $56b_a$, ..., $56n_a$, multiplied by weighting factors associated with channel a, are combined by the combiner 58a to produce a combined weighted information signal 60a. This process is repeated until the weighted information signals $56a_n$, $56b_n$, ..., $56n_n$, multiplied by the weighting factors associated with channel n, are combined in the combiner 58n to produce a combined weighted information signal 60n. The combined weighted information signals 60a–n are then modulated, power amplified, and transmitted.

FIG. 2 illustrates a "full house" system which has as many different information sources (n) as the number of frequency channels (n) over which each information signal is coded. This is the maximum number of different signals that can be orthogonally coded across "n" channels when their spread-spectrum access codes are otherwise the same.

To ensure orthogonality, the weighting factors Wik must have the orthogonality property such that $(W^*ik)(Wjk)=0$ if $i$ is not equal to $j$, where summation over the repeated channel index "k" is implied (inner vector product) and "*" means complex conjugate.

Walsh-Hada-mard codes are examples of real-valued functions that possess the above property, consisting only of values +1 or −1. These can be used when "n" is equal to a power of two. Fourier sequences are examples of complex-valued codes that have the above property, which can be used for any value of "n". For example, the Fourier sequences for "n"=3 are:

$$\begin{array}{c|ccc} \diagdown k & & & \\ i & & & \\ \hline & 1 & 1 & 1 \\ & 1 & w & w^* \\ & 1 & w^* & w \end{array}$$

where w is the complex number $\cos(120°)+j\cdot\sin(120°)$.

In the simplest case of n=2, two-charnel orthogonal multicarrier modulation may be constructed using weighting factors (Walsh codes) W11=1, W12=1, W21=1, W22=−1, which has the effect of placing a first signal equally in two channels while placing the second signal out of phase in the second channel as compared to the first channel.

The orthogonal sequences remain orthogonal if all weighting factors for the same information signal in different channels are scaled by a power control value generated at the receiving source. The power control values are used by the transmitter to either increase or decrease the strength of the transmitted signals, based upon the transmitted signals received by the receiving source being too weak or too strong, respectively. Orthogonality is maintained by increasing and reducing in like amounts in all of the channels. Thus each information signal may be additionally scaled according to the power that the destination receiver requires for good signal decoding. Such techniques are known and need not be described herein. Orthogonality is also maintained if all signals in the same channel have their transmit power raised or lowered alike.

Referring to FIG. 3, a second implementation of the inventive signal converter is shown generally at 62, with like elements of FIG. 2 indicated with the same reference numbers. As shown in FIG. 3, the order of spread-spectrum coding and weighting is interchanged with a set of orthogonal weighting values. If the source and error coders 44a–n produce modulation symbols, such as real BPSK (Binary Phase Shift Keying) symbols or complex QPSK (Quadrature Phase Shift Keying) or OQPSK (OFFSET-QPSK) symbols for example, as a sequence of I,Q symbols, these symbols can be multiplied by the desired real or complex weighting factor Wik prior to spread-spectrum coding. The resulting weighted complex I,Q sequence at the coded information symbol rate may then be further multiplied with the appropriate spread-spectrum access code to expand the chip rate and thus the spectrum. The different spread-spectrum signals corresponding to different information signals for transmission in the same frequency channel may then be added by an adder (not shown), and a common filter (not shown) applied after addition and before I,Q modulation.

It will be appreciated by persons of ordinary skill in the art that the order of multiplication by two factors (weighting factors and access codes) may be interchanged, and the order of application of two linear processes such as linear addition and linear filtering may be interchanged, thus giving rise to many equivalent implementations which all fall within the spirit and scope of the present invention.

In the case where the weighted sum of signals intended to be transmitted on a given channel are to be spread using the same access code, it can be efficient to apply the same access code to the weighted sum. This implementation is shown in FIG. 3. In FIG. 3, the source and error coded signals 46a–n are each split between "n" channel weighting multipliers 54 where they are weighted by a weighting factor Wik, where "i" is the signal index and "k" is the channel index on which the signal is to be transmitted. It should be noted that the coded signals 46a–n, and the signals thereafter, while indicated by a single line are actually complex signals having both a real (I) and imaginary (Q) parts.

For example, the coded signal 46a is multiplied by weighting factors Waa to Wan by multipliers 54, producing n weighted information signals $64a_{a-n}$. The other coded signals 46b–n are multiplicatively weighted in the same manner, with each signal developed into n respective weighted information signals. Weighted information signals for like channels are combined in combiners 66a–n, producing a plurality of combined weighted information signals 68a–n. The combined weighted information signals 68a–n are subjected to respective access codes 70a–n and respective spread-spectrum coders 72a–n. The spread-spectrum combined weighted information signals 74a–n are then modulated, power amplified, and transmitted. The access code is the same for all signals in the same channel, but there is no requirement that the access codes for different channels be the same. This arrangement is efficient because it performs as many operations as possible on low-sample-rate signals first, before expansion through spread-spectrum coding to a higher chip rate.

The arrangements of FIGS. 2 and 3 permit transmission of n signals using n channels, but in a way that spreads each signal over all n channels, giving the advantages of frequency diversity while maintaining orthogonality between the n signals.

A number of signals greater than n may be transmitted by duplicating FIG. 3 for another n signals that use spread-spectrum access codes orthogonal to those used in the first arrangement. This is illustrated in FIG. 4. which is a block diagram of an alternate embodiment of the inventive signal converter, shown generally at 76.

As shown in FIG. 4, a signal converter 76 includes signal processing blocks 78a and 78b, each receiving a set of n different information signals. Each of the signal processing blocks 78a and 78b includes source and error coding units 44a–n, multipliers 54 and combiners 66a–n as shown and described with respect to FIG. 3. Thus, signal processing block 78a receives information signals a–n and develops a plurality of combined weighted information signals 80a–n, where n corresponds to the number of channels. Similarly, signal processing block 78b receives information signals (n+1) . . . 2n and develops combined weight information signals 82a–n. The combined weighted outputs of signal processing blocks 78a and 78b are still as yet unspread, and so they are then spread-spectrum coded in spread-spectrum coders 84a–n for signals from block 78a and spread-spectrum coders 86a–n for signals from block 78b, producing respective pluralities of spread-spectrum combined weighted information signals 88a–n and 90a–n.

As shown in FIG. 4, spread-spectrum coders 84a–n use spread-spectrum access codes that are the same for all channels a–n. Similarly, spread-spectrum coders 86a–n use access codes that are the same for all channels a–n, but which are orthogonal to the codes used in spread-spectrum coders 84a–n. Signals 88a and 90a are combined by a combiner 92a producing a further combined signal 94a for transmission in channel a. Similar combining is performed by combiners 92b–n on signals 88b–n and 90b–n producing further combined signals 94b–n for transmission on channels b–n, respectively. Thus, orthogonal waveforms are provided within each channel, even for a pair of signals, one from block 78a and one from block 78b that use the same set of weighting factors. On the other hand, a pair of signals from blocks 78a or 78b that use the same spread-spectrum access code are orthogonal by virtue of using orthogonal weighting factor sets. Thus any two pairs of the 2n signals of FIG. 4 are mutually orthogonal. Other sets of n signals may be processed for transmission across the n channels in similar fashion, up to the maximum number of orthogonal access codes that can be constructed. In the example of a spreading factor equal to 8, using 8-bit access codes, 8 such sets of n information signals can be transmitted using n channels with mutual orthogonality. Using a spreading factor of m, m mutually orthogonal spreading sequences can be found that thus permit mn orthogonal signals to be transmitted using n channels.

The total of mn signals are each transmitted using a combination of spread-spectrum access code and cross-channel weight sequence as illustrated in the table below:

| ASSIGNMENT OF ACCESS CODES AND WEIGHT SEQUENCES | | | | |
|---|---|---|---|---|
| CODE/WEIGHT | WEIGHT SET 1 | WEIGHT SET 2 | ............. | WEIGHT SET n |
| CODE 1 | SIGNAL 11 | SIGNAL 12 | . | SIGNAL 1n |
| CODE 2 | SIGNAL 21 | SIGNAL 22 | . | SIGNAL 2n |
| . | . | . | . | . |
| . | . | . | . | . |
| CODE m | SIGNAL m1 | SIGNAL m2 | . | SIGNAL mn |

For example, referring to FIG. 4 in relation to the table above where m=2, signals 11, 12, . . . , 1n correspond to signals 88a, 88b, . . . , 88n and signals 21, 22, . . . , 2n correspond to signals 90a, 90b, . . . , 90n, respectively.

FIG. 5 illustrates an alternate variation of the signal converter shown in FIG. 4, with like elements indicated by the same reference numbers and those elements that have been slightly modified indicated with a prime ('). The signal converter 76' shown in FIG. 5 operates in the same manner as the signal converter 76 described with respect to FIG. 4, using access codes and weighting factor sets jointly to provide orthogonality between mn signals transmitted using n channels. However, as shown in FIG. 5, the access codes used in coders 84a'–n' and 86a'–n' have been permuted. Instead of using the same access code for all channels a–n, spread-spectrum coders 84a'–n' use different access codes for each channel a–n. Similarly, spread-spectrum coders 86a'–n' also use different access codes for each channel a–n. The signals retain mutual orthogonality since the access codes used by spread-spectrum coders for the same channel are orthogonal. For example, the access code used by spread-spectrum coder 84a' is orthogonal to the access code used by spread-spectrum coder 86a'. Similarly, the access code used by spread-spectrum coder 84n' is orthogonal to the access code used by spread-spectrum coder 86n'. While the access codes used by spread-spectrum coder 84a' and 86n' are the same, and the access codes used by spread-spectrum coder 84n' and 86a' are the same, orthogonality is not affected since the access codes are being used on different channels.

FIG. 6 depicts a further variation of the signal converter 76 shown in FIG. 4 with like elements indicated with the same reference numbers and those elements which have been slightly modified indicated with a double prime ("). With this variation, it does not matter whether the access codes utilized by each set of spread-spectrum coders 84a"–n" and 86a"–n" even belong to the same orthogonal set, since they are used on different channels and do not interact. The signal converter 76" shown in FIG. 6 operates in the same manner as the signal converter 76 previously described with respect to FIG. 4, and accordingly, a detailed discussion is not necessary. As shown in FIG. 6, each of the access codes used by spread-spectrum coders 84a"–n" and 86a"–n" are different and are not reused in different channels as in FIG. 5. However, the access codes used by the coders 84a"–n" should preferably form an orthogonal set, and the access codes used by the coders 86a"–n" should also form an orthogonal set, but which may be an orthogonal set differing by a constant from the first orthogonal set. Such different, but still mutually orthogonal sets can be constructed by first starting with a Walsh-Hadamard set, and then bitwise exclusive-ORing any bit pattern to all codes in the set alike. For example, the Bent codes disclosed in U.S. Pat. No. 5,353,352, issued to Dent and Bottomley on Oct. 4, 1994 and entitled "Multiple Access Coding for Radio Communications" and U.S. Pat. No. 5,550,809, issued to Bottomley and Dent on Aug. 27, 1996 and entitled "Multiple Access Coding Using Bent Sequences for Mobile Radio Communications" may be used, which patents are hereby incorporated by reference herein. In a cellular system employing orthogonal coding, the above patents disclose that a second cellular cell employing the same frequency channel as a first cell can advantageously employ a set of orthogonal codes modified by use of a different Bent sequence as compared to the first cell.

In multi-carrier cellular systems using orthogonal weighting function sets to provide orthogonal cross-channel spreading as disclosed herein, it may also be advantageous if the orthogonal weighting function set used in a second cell differs from that of a first cell, so that no weighting function of one cell is exactly equal to that of another cell. However, when considering the different propagation factors (channel estimates) applied to different channels received from different transmitters, there is most likely little correlation between signals received from different transmitters even without deliberate steps to ensure so.

While the inventive signal converter has been described as including various pluralities of spread-spectrum coders, each of the pluralities of spread-spectrum coders may be replaced with a single spread-spectrum coder performing all of the functions of the pluralities of spread-spectrum coders, without departing from the spirit and scope of the present invention.

FIG. 7 illustrates one form of transmission of the signals described above, where each of the signals to be transmitted are received by an IQ modulator 96, which develops a plurality of modulated complex signals 98a–n. The modulated signals 98a–n are combined into a power amplifier 100 and transmitted via antenna 102. Alternately, an IQ modulator may be provided for each channel a–n. Further, each of the modulated signals 98a–n may be power amplified independently and then combined for transmission. All of the channels are transmitted at once either by using a single wideband antenna 102 as shown in FIG. 7, or a plurality of narrowband antennas.

FIG. 8 is a block diagram of a receiver, shown generally at 104, for receiving and processing the inventive multi-channel spread-spectrum signals. The multi-channel signals are received at an antenna 106 and processed in a multi-channel receiver 108 to separate the channels, filter, amplify and downconvert the separated channel signals and convert them from analog to digital form for processing. The digitized output stream of complex-valued samples 110a–n are processed in orthogonal despreaders 112a–n, where different shifts of the sample stream are correlated with one or more mutually orthogonal spreading codes. The despreaders 112a–n can, for example, be so-called matched filters or sliding correlators and may make use of any of the improvements disclosed in U.S. patent application Ser. No. 08/967,444 to Dent and Wang, filed Nov. 11, 1997 and entitled "Efficient Sliding Correlator", U.S. patent application Ser. No. 09/197,597 to Dent and Urabe, filed Nov. 23, 1998 and entitled "Reduced Power Matched Filter", U.S. patent application Ser. No. 08/748,755 to Bottomley et al, filed Nov. 14, 1996 and entitled "Despreading of Direct Sequence Spectrum Communication Signals", all of the disclosures of which are hereby incorporated by reference herein.

If signals using a large number, or all, of the available orthogonal codes are to be despread, a Fast Walsh Transform circuit as described in U.S. Pat. No. 5,357,454, issued to Dent on Oct. 18, 1994 and entitled "Fast Walsh Transform Processor" may be utilized for the despreaders 112a–n, which patent is hereby incorporated by reference herein. The despreader identifies the magnitude and phase of each of the multi-path rays on a symbol-by-symbol basis, with each despreader 112a–n outputting a series of despread different delayed rays 114a–n.

For coherent demodulation, the effect of phase and amplitude changes introduced by the propagation path must be distinguished from the effect of modulation due to the coded information symbols, for which purposes channel estimates may be used. Channel estimates are denoted by Cij for the j'th delayed ray in channel i. In order to remove the effect of the propagation channel, the correlation for a particular symbol and ray can be divided by the channel estimate for that ray. This can be dangerous in fading environments where rays can fade to zero or small values since dividing a faded ray by a small channel estimate enhances the noise. However, ray sorters 116a–n first identify the strongest of all rays from despreaders 112a–n, that is, the least-faded ray is selected in each channel. In FIG. 8, this is the ray with delay 3 for channel a, and the ray with delay 5 for channel n. The largest ray for channel a is then normalized by dividing it by the channel estimate for the largest ray (Ca3) in multiplier 118a, and likewise the largest rays for the other frequency channels are selected and normalized by respective channel estimates, i.e., channel estimate Cn5 for channel n where ray 5 is the strongest. The values from multipliers 118a–n will now be proportional to their values as transmitted.

These values are then further weighted by the complex conjugate W*ik of the set of weights used for the signal in question, using multipliers 120a–n. Using the complex conjugate undoes any phase inversion or phase rotation applied by the cross-channel weighting at the transmitter. All of the despread and weighted rays from all channels a–n should now be phase-aligned and so may be combined in combiner 122 to obtain a symbol value 124 that has been received via the strongest path in each channel. The process is now repeated using the second largest rays of each channel to obtain a symbol value received via the second strongest path 126, the third largest rays of each channel to obtain a symbol value received via the third strongest path 128, and so forth until all rays of significance have been used. Finally, these values 124, 126, 128, . . . are combined together in a combiner 130 after further weighting multiplier 132 for each ray using a weighting factor U1 for the strongest ray values, U2 for the second strongest ray values etc, where U1, U2 . . . are preferably proportional to the signal-to-noise ratio, or wanted to unwanted signal ratio, for each of the rays. The final combined value 134 from the combiner 130 is a complex value that contains soft symbol information for one or more coded information bits per symbol, and these soft values are further processed in an error correction decoder 136 using known techniques that can include converting symbol-wise soft information to bit-wise soft information, convolutional decoding using a Viterbi Maximum Likelihood Sequence Estimation algorithm (MLSE), Cyclic Redundancy Checking to detect uncorrected errors, etc. The hard bits 138 output by the error correction decoder 136 represent the originally transmitted information bits.

By the device of normalizing and combining only the strongest rays of each channel together first, and subsequently the second strongest rays, etc., it is contemplated thereby to combine rays only of similar strength and therefore reduce the noise magnification problem alluded to above, when some rays have faded and others have not.

Another way of reducing the noise magnification problem when normalizing faded rays is to employ per signal and per-channel closed-loop power control. Each receiver reports to the transmitter the strength of the signal it receives in each channel. This may be the strength of the strongest ray or alternatively the sum of the power in all rays. The transmitter, via weighting multipliers 54, then increases the power transmitted in a channel to a receiver that is receiving lower than the desired power in the channel, while reducing the power transmitted in a channel to a receiver receiving higher power than the desired power in that channel. Because the fading is expected to be uncorrelated between different receivers and frequency channels, the extra power needed for the disadvantaged receivers is compensated by the reduction of power transmitted to the advantaged receivers. When using this method, however, it is not possible to maintain orthogonal weight sequences unless all signals in a subgroup that are assigned respective ones of the orthogonal sequences are power-controlled by the same factor in the same frequency channel. Since this would produce an undesirable change in the power level of other signals, independent power control in different frequency channels is likely to be more useful in the case of using non-orthogonal weight sequences than in the case of using orthogonal weight sequences. There is thus an argument for reverse power control, to reduce the power transmitted to a receiver in the frequency channels with bad propagation compared to the power transmitted in channels experiencing good propagation. In this manner, power is not wasted attempting to overcome temporary fading.

Due to a delayed ray of a signal no longer being orthogonal to the undelayed rays, or rays of different delay, belonging to another signal, the ray separation achieved by despreaders 112a–n is imperfect. Each despread value for the strongest rays of a given signal contains an error due to the effect of all the other rays (i.e., rays of different delay than the strongest ray) of all the other signals. Using orthogonal codes, however, guarantees that other signal rays of the same delay as the strongest ray of a given signal do not interfere. For receivers, such as those used at a cellular base station, that have to decode all signals, a so called multi-user detector, joint demodulator, or other such technique may be used to reduce the non-orthogonal interference effects between rays of different delay. If the spreading codes are known, this can be achieved by multiplying the set of despread values for all signals and rays by the inverse of a cross-correlation matrix.

There will be little or no correlation of the error quantities for different channels, therefore they do not add constructively when combined in combiner 122 after multiplying by channel weights W*ak, W*bk, . . . ,W*nk. However, neither do the errors due to signals using orthogonal weighting sets cancel, except for the errors due to the same rays of those signals.

From FIG. 8, it is apparent that the successive multiplicative scalings of each ray, for example, using multipliers 118a, 120 and 132 for the strongest ray in channel a, is equivalent to a single multiplication by the composite factor (U1)(W*ak)/Ca3, where U1 is the weighting factor for the strongest ray values, W*ak is the complex conjugate of the weight set for channel a, and Ca3 is the channel estimate for channel a where ray 3 is the strongest.

The factors used above represent a nominal choice which nominally eliminates the orthogonal interference, but does not necessarily reduce non-orthogonal interference. The more general formulation of the problem of a multi-channel RAKE receiver is to determine the set of weights g (i, j, k, l) that should be applied to multiply the j'th ray for the i'th channel for the signal using the l'th access code in each channel and the k'th set of cross-channel weights prior to summing the values over the indices i and j to obtain a soft symbol value for the signal with indices (k, l).

Solving the whole problem for all signals at the same time, as is of interest in a cellular base station, requires one type of multi-user or joint demodulator. If the problem is solved for only one signal at a time, however, to yield a matrix of values g(i j) for that signal, requires a simpler receiver which may be of interest for use in a cellular phone that is interested to receive only one signal at a time. In a practical implementation, it may be simpler to estimate the signal-to-(noise+interference) ratio for each ray in each channel based on observation and processing of the received signal, rather than determining a formula based on the number of active signals, the codes in use in each channel, and the power level of each signal, as providing the latter information to a receiver would represent a considerable amount of signaling.

Channel estimates are used in the inventive receiver to rotate the phase of the despread contributions from each frequency channel so that they will add constructively, enhancing the ratio of the decoded desired signal component to interfering components. The channel estimates may also be used to scale the amplitude of the contributions from each frequency channel, so unwanted signals using orthogonal cross-channel weights will be cancelled.

Channel estimates may be obtained by using one of the available orthogonal code/weighting-set combinations to transmit a non-information-bearing signal, i.e., a pure code, called a pilot code in U.S. IS95 systems. Another method is described in U.S. Pat. No. 5,377,183, issued to Dent on Dec. 27, 1994 and entitled "Calling Channel in CDMA Communications System", in which a call-alerting signal, which is transmitted at the highest power level so as to reach cell boundaries, may also be used as a pilot code. In one variant of the disclosed method, information bearing or "traffic" signal codes are modulated with the product of the desired information and the information applied to the call alerting channel, so that when using the call alerting channel signal as a coherent reference for decoding the traffic signals, the call-alerting information modulation cancels out. The above-mentioned '183 patent is hereby incorporated by reference herein.

In another method described in U.S. patent application Ser. No. 09/247,609 to Dent, filed Feb. 10, 1999 and entitled "Maximum Likelihood Rake Receiver for Use in a Code Division, Multiple Access Wireless Communication System", pilot symbols are transmitted by periodically inserting known symbols in the middle of a stream of traffic symbols, the known symbols being known to the receiver in advance and being used to assist decoding the traffic symbols which are not known to the receiver in advance. The above-mentioned application, the disclosure of which is hereby incorporated by reference herein, also discloses how to use the traffic symbols after decoding as additional "known" symbols to enhance channel estimation. This may be done for all possible decodings of traffic symbols to produce candidate sets of channel estimates, each of which is used for decoding the traffic symbol string with which it has been derived. Yet another method of channel estimation, described in U.S. Pat. No. 5,305,349, issued to Dent on Apr. 19, 1994 and entitled "Quantized Coherent Rake Receiver", may be used for decoding multi-bit symbols transmitted using orthogonal or bi-orthogonal codes. After decoding a previous symbol by deciding which of a multiplicity of orthogonal codes was transmitted, the phase and amplitude of the decoded code is used to provide a channel estimate for decoding the next symbol. The above '349 patent is hereby incorporated by reference herein.

An advantage of using those of the above-described methods that derive channel estimates separately from each information-carrying signal itself, rather than using a common pilot code or common pilot symbols, is that each signal may then be transmitted using a different antenna beam optimized for the destination receiver. For communication in a direction from spatially distributed subscriber terminals, such as mobile phones, to a central base station, it is essential to derive channel estimates from each signal itself, using either per-signal pilot codes that are transmitted overlapping the information signal code, or else by multiplexing known pilot symbols with the information symbols.

In scaling a signal contribution from a given frequency channel by the inverse of a channel estimate, orthogonal signal codes are suppressed but at the expense of magnifying the noise in channels having relatively low channel estimates. This effect is reduced by combining together the strongest rays from each channel, then the second strongest rays, and so forth, and then combining the combined rays using further weights. The mathematical expression for this technique is as follows:

$$\text{Total Combined Result for a given information symbol} =$$

If random noise or other-cell interference is dominant over the within-cell interference, a different weighting is required, namely:

$$\text{Total Combined Result for a given information symbol} =$$

In both cases, the phase of the weighting factor is the same, that is, it is equal to the inverse of the phase of the channel estimate $C_{ij}$. When a mixture of noise or other-cell interference to in-cell interference exists, it can be postulated that a compromise weighting factor lying between $C^*_{ij}$ and $1/C_{ij}$ is optimum, which compromise weighting factor would have the same phase as both the above, but an amplitude between the two. Such a weighting factor would, for example, be:

$$Q_{ij} = (x/(x+y))C^*_{ij} + (y/(x+y))/C_{ij}$$

where "x" is the out-of-cell interference and "y" is the in-cell interference. In this case the value for the weighting factor $U_j$ would be $$U_j = \sum_i \left| \frac{C_{ij}}{Q_{ij}} \right|$$

The above weightings agree with the best weightings to use at least for the extremes of all in-cell and all out-of-cell interference, and are therefore expected to behave close to optimally for intermediate cases.

An estimate of the ratios of in-cell to out-of-cell interference may be made by measuring the strength of own-cell transmissions and surrounding cell transmissions, which a mobile phone normally does for the purposes of handoff. Values of x and y could also be estimated only at call set up and kept fixed for the duration of a call. The estimate may also be made by the serving base station based on the estimated proximity of a mobile phone to the cell boundary, either by position estimating or from the observed signal strength, as for example disclosed in U.S. Pat. No. 5,670,964, issued to Dent on Sep. 23, 1997 and entitled "Navigation Assistance for Call Handling in Mobile Telephone Systems", which is hereby incorporated by reference herein.

FIG. 9 illustrates an additional implementation of a receiver, shown generally at 140, for receiving and processing the inventive multi-channel spread-spectrum signals. The multi-channel signals are received at the antenna 106 (see FIG. 8) and processed in the multi-channel receiver 108 (see FIG. 8) to separate the channels, filter, amplify and downconvert the separated channel signals and convert them from analog to digital form for processing. The digitized output stream of complex-value samples 110$a$–$n$ are processed in orthogonal despreaders 112$a$–$n$ as shown and described with respect to FIG. 8. Each of the despreaders 112$a$–$n$ identifies the magnitude and phase of each of the multi-path rays on a symbol-by-symbol basis and outputs a series of despread different delayed rays 142$a_{a-m}$, 142$b_{a-m}$, ..., 142$n_{a-m}$, with each series of rays 142$a_{a-m}$, 142$b_{a-m}$, ... 142$n_{a-m}$ received at respective RAKE receivers 144$a$, 144$b$, ..., 144$n$.

Channel estimates, denoted by Cij for the j'th delayed ray in channel i, are obtained by any means. The RAKE receivers 144$a$–$n$ multiply each of the multi-path rays for each channel a–n by its respective channel estimate Cij in multipliers 146, combine the multiplied outputs for each channel a–n in combiners 148, and develop one real or complex number per channel, denoted 150$a$–$n$, for each coded information symbol period. The RAKE receivers 144$a$–$n$ may be of conventional type or of improved type as disclosed by any of the references incorporated herein by reference.

Each of the per-channel RAKE combined outputs 150$a$–$n$ is received by a cross-channel combiner 152 which further weights and combines the RAKE combined outputs 150$a$–$n$ to develop a final combined value 154 per coded information symbol. The final combined value 154 is a soft value which is further processed in an error correction decoder 156 using known techniques that can include converting symbol-wise soft information to bit-wise soft information, convolutional decoding using a Viterbi Maximum Likelihood Sequence Estimation algorithm, Cyclic Redundancy Checking to detect uncorrected errors, etc. The hard bits 158 output by the error correction decoder 156 represent the originally transmitted information bits.

Operation of the cross-channel combiner 152 is as follows. If the channel estimates were obtained using a pilot code or pilot symbols common to all signals in the channel, the cross-channel weighting factors applied to each individual signal Wa, Wb, ..., Wn for a given signal will not have been removed in the RAKE receivers 144$a$–$n$. Therefore, the conjugates of the weighting factors for the desired signal must be applied to the per-channel RAKE combined outputs 150$a$–$n$ to undo any phase inversion or phase rotation applied by the cross-channel weighting at the transmitter. The RAKE combined outputs 150$a$–$n$ are thus multiplied by the conjugate of the respective weighting factor W*a, ..., W*n by multipliers 160$a$–$n$.

If, on the other hand, the channel estimates were obtained using per-signal pilot symbols that were multiplexed with the signal's data symbols and thereby subjected at the transmitter to the same cross-channel weighting factors, the per-channel RAKE combining by the RAKE receivers 144$a$–$n$ will remove the cross-channel weighting factors, and the conjugate weighting factors W*a, ..., W*n applied by the cross-channel combiner 152 will be set to unity.

In either of the above cases, in order to effect cancellation of signals having orthogonal cross-channel weights, the per-channel RAKE outputs 150$a$–$n$ should be scaled to the same amplitude by dividing each by the sum of the squares of the channel estimates, i.e., RAKE weights, for the respective channel. This is shown in the denominator of the values applied to multipliers 160$a$–$n$ and represents the total per-channel energy. When using this method to preserve orthogonality despite different channel gains, the danger of dividing by zero is reduced by virtue of the low likelihood that the sum of the squares of all rays (channel estimates of the rays) will be zero, as this would imply that all multi-path rays had faded simultaneously.

One skilled in the art will appreciate that when in-cell interference, i.e., interference from other signals transmitted from the same transmitter, is not dominant, scaling other than division by the total per-channel energy may be utilized. For the extreme case of no in-cell interference, no scaling is needed. For the extreme case of total in-cell interference, scaling by division by the total per-channel energy is utilized. For cases where the interference is partly in-cell interference and partly other-cell interference or noise, scalings may be devised falling between no scaling and division by the total per-channel energy.

The further weighted and scaled outputs 162$a$–$n$ from multipliers 160$a$–$n$ are added in combiner 164 to produce the final combined value 154, which is processed by the error correction decoder 156, as previously described, to develop the sequence of hard bits 158 representative of the originally transmitted signal.

Another variation in the inventive signal converter consists of using a within-channel spreading technique that provides improved orthogonality between different signals under multi-path conditions. This technique employs interleaving several successive orthogonal codes carrying different information bits, so that all the first code bits are transmitted first, all of the second code bits are transmitted second, and so forth. This is also equivalent to transmitting a block of information bits N times in succession, where N is the within-channel spreading factor, using a different sign or phase rotation for each block-repeat selected from a set of orthogonal codes or phase-sequences. This technique is described in U.S. patent application Ser. No. 08/898,392 to Dent, filed Jul. 22, 1997 and entitled "Communication System and Method with Orthogonal Block Encoding,", the disclosure of which is hereby incorporated by reference herein.

The inventive signal converter for use in a multi-carrier CDMA system described herein provides spreading of a signal over a wide frequency range, providing frequency diversity, and having advantages over a conventional wideband CDMA technique that would simply use a higher chip-rate spreading code to obtain wider spectral spreading. Spreading can be obtained over a non-contiguous spectrum as the channels used do not have to be adjacent. Accordingly, even where a particular frequency allocation owned by a communications service provider is disjointed, the spread-spectrum techniques described herein may still be employed. Further, the signal processing effort needed for advanced multi-user demodulation algorithms is thereby reduced due to the number of multi-path rays that have to be resolved being lower. This also helps to hold down the level of non-orthogonal interference caused by time-shifted copies of the signal.

While the invention has been described with particular reference the drawings, it should be understood that various modifications could be made, such as combining any of the teachings of the incorporated material or other prior art, without departing from the scope and spirit of the present invention.

What is claimed is:

1. A signal converter for use in a Code Division Multiple Access (CDMA) communications system utilizing multiple frequency channels for transmission, said signal converter comprising:

a plurality of weighting multipliers each receiving a different one of a plurality of information signals for transmission in each of a plurality of frequency channels, each of said plurality of weighting multipliers multiplying its received information signal by a different sequence of frequency-channel-associated weights and developing a plurality of weighted information signals that are across-channel coded;

a plurality of combiners each associated with a different one of the plurality of frequency channels, each of said plurality of combiners receiving a select weighted information signal from each of the plurality of weighting multipliers corresponding to different information signals and combining said select weighted information signals for transmission in the same one of said plurality of frequency channels to develop a plurality of combined weighted information signals; and a spread-spectrum coder receiving one of either (a) the plurality of information signals, or (b) the plurality of combined weighted information signals, and encoding the received signals using respective spread-spectrum access codes to develop one of either (a) a plurality of spread-spectrum information signals, or (b) a plurality of spread-spectrum combined weighted information signals, wherein the plurality of spread-spectrum information signals comprises the plurality of information signals received by the plurality of weighting multipliers when the spread-spectrum coder receives the plurality of information signals.

2. The signal converter of claim 1, wherein said spread-spectrum coder uses a first spread-spectrum access code to encode a subgroup of said plurality of information signals in one of said plurality of frequency channels, with each information signal within said subgroup weighted by the plurality of weighting multipliers with a frequency-channel-associated weight orthogonal to the frequency-channel-associated weights used by other information signals in said subgroup.

3. The signal converter of claim 2, wherein said first and second sets of orthogonal sequences of frequency-channel-associated weights comprise Fourier sequences.

4. The signal converter of claim 1, wherein said spread-spectrum coder uses a first set of respective spread-spectrum access codes which are mutually orthogonal to encode a first subgroup of said plurality of information signals in one of said plurality of frequency channels.

5. The signal converter of claim 4, wherein the spread-spectrum coder uses a second set of mutually orthogonal spread-spectrum access codes, which second set is not orthogonal to the first set, to encode a second subgroup of said plurality of information signals in said one of said plurality of frequency channels.

6. The signal converter of claim 5, wherein respective weighting multipliers weight the first subgroup of orthogonally spread-spectrum encoded information signals using a first set of frequency-channel-associated weights, and respective weighting multipliers weight the second subgroup of orthogonally spread-spectrum encoded information signals using a second set of frequency-channel-associated weights, the first set of weights used for the first subgroup being orthogonal to the second set of weights used for said second subgroup.

7. The signal converter of claim 5, wherein the first and second sets of mutually orthogonal spread-spectrum access codes are chip-interleaved to reduce the loss of orthogonality resulting from multi-path propagation during transmission.

8. The signal converter of claim 5, wherein the first and second sets of mutually orthogonal spread-spectrum access codes comprise Fourier sequences.

9. The signal converter of claim 5, wherein the first and second sets of mutually orthogonal spread-spectrum access codes comprise Walsh codes.

10. The signal converter of claim 5, wherein the first and second sets of mutually orthogonal spread-spectrum access codes comprise Walsh codes modified by the addition of common access codes.

11. The signal converter of claim 10, wherein said common access codes comprise Bent sequences.

12. The signal converter of claim 2, wherein said first and second sets of orthogonal sequences of frequency-channel-associated weights comprise Walsh codes.

13. The signal converter of claim 1, wherein each of said frequency-channel-associated weights in the first and second sets incorporates a power level setting for each of said plurality of information signals.

14. The signal converter of claim 13, wherein the plurality of weighting multipliers keep the relative power level ratio of one information signal to another equal in each of said plurality of frequency channels.

15. The signal converter of claim 13, wherein the power level setting for a particular information signal in each of said plurality of frequency channels is controlled by feeding back, to the plurality of weighting multipliers, signal strength measurements made by a receiver of the CDMA communications system receiving the particular information signal in each of said plurality of frequency channels.

16. The signal converter of claim 15, wherein the plurality of weighting multipliers reduce the power level setting for said particular information signal in a first one of said plurality of frequency channels compared to the power level setting for said particular information signal in a second one of said frequency channels if the signal strength measurements made by the receiver indicate a lower received signal strength for said particular information signal in the first frequency channel as compared to the second frequency channel.

17. The signal converter of claim 1, wherein said plurality of frequency channels are non-contiguous.

18. The signal converter of claim 1, wherein said signal converter is included as a component of a cellular telephone base station.

19. The signal converter of claim 18, wherein one of said plurality of information signals is a call-alerting signal.

20. The signal converter of claim 18, wherein one of said plurality of information signals is a pilot signal including known information symbols.

21. The signal converter of claim 1, wherein said plurality of information signals include pilot symbols.

22. A transmitter for use in a Code Division Multiple Access (CDMA) communications system utilizing multiple frequency channels for transmission, said transmitter comprising:

a signal converter comprising:

a plurality of weighting multipliers each receiving a different one of a plurality of information signals for transmission in each of a plurality of frequency channels, each of said plurality of weighting multipliers multiplying its received information signal by a different sequence of frequency-channel-associated weights and developing a plurality of weighted information signals that are across-channel coded;

a plurality of combiners each associated with a different one of the plurality of frequency channels, each of said plurality of combiners receiving a select weighted information signal from each of the plurality of weighting multipliers corresponding to different information signals and combining said select weighted information signals for transmission in the same one of said plurality of frequency channels to develop a plurality of combined weighted information signals; and a spread-spectrum coder receiving one of either (a) the plurality of information signals, or (b) the plurality of combined weighted information signals, and encoding the received signals using respective spread-spectrum access codes to develop one of either (a) a plurality of spread-spectrum information signals, or (b) a plurality spread-spectrum combined weighted information signals, wherein the plurality of spread-spectrum information signals comprises the plurality of information signals received by the plurality of weighting multipliers when the spread-spectrum coder receives the plurality of information signals;

a modulator receiving one of either (a) the plurality of combined weighted information signals, or (b) the plurality spread-spectrum combined weighted information signals, and modulating the received signals with respective channel frequencies to develop a plurality of modulated information signals; and at least one antenna receiving the plurality of modulated information signals and transmitting the plurality of modulated information signals across the CDMA communications system in each of the plurality of frequency channels.

23. A method of developing wide-channel Code Division Multiple Access (CDMA) information signals for transmission in multiple frequency channels, said method comprising the steps of:

multiplying each of a plurality of information signals for transmission in each of a plurality of frequency channels by a different sequence of frequency-channel-associated weights to develop a plurality of weighted information signals that are across-channel coded;

combining select weighted information signals corresponding to different information signals for transmission in the same one of said plurality of frequency channels to develop a plurality of combined weighted information signals; and encoding one of either (a) the plurality of information signals, or (b) the plurality of combined weighted information signals, using respective spread-spectrum access codes to develop one of either (a) a plurality of spread-spectrum information signals, or (b) a plurality of spread-spectrum combined weighted information signals, wherein the plurality of spread-spectrum information signals comprises the plurality of information signals multiplied at said multiplying step when the plurality of information signals are encoded at said encoding step.

24. The method of claim 23, wherein a first subgroup of said plurality of information signals in one of said plurality of frequency channels is encoded using a first set of respective spread-spectrum access codes which are mutually orthogonal.

25. The method of claim 24, wherein a second subgroup of said plurality of information signals in said one of said plurality of frequency channels is encoded using a second set of mutually orthogonal spread-spectrum access codes, which second set is not orthogonal to the first set of codes used by said first subgroup.

26. The method of claim 25, wherein the first subgroup of orthogonally spread-spectrum encoded information signals is weighted using a first set of frequency-channel-associated weights, and the second subgroup of orthogonally spread-spectrum encoded information signals is weighted using a second set of frequency-channel-associated weights, the first set of weights being orthogonal to the second set of weights.

27. The method of claim 25, further comprising the step of chip-inter-leaved the first and second sets of mutually orthogonal spread-spectrum access codes to reduce the loss of orthogonality resulting from multi-path propagation during transmission.

28. The method of claim 25, wherein the first and second sets of mutually orthogonal spread-spectrum access codes comprise Fourier sequences.

29. The method of claim 25, wherein the first and second sets of mutually orthogonal spread-spectrum access codes comprise Walsh codes.

30. The method of claim 25, wherein the first and second sets of mutually orthogonal spread-spectrum access codes comprise Walsh codes modified by the addition of common access codes.

31. The method of claim 30, wherein said common access codes comprise Bent sequences.

32. The method of claim 23, wherein a subgroup of said plurality of information signals in one of said plurality of frequency channels is encoded using a first spread-spectrum access code, and wherein each information signal within said subgroup is weighted with a frequency-channel-associated weight orthogonal to the frequency-channel-associated weights used by other information signals in said subgroup.

33. The method of claim 32, wherein said first and second sets of orthogonal sequences of frequency-channel-associated weights comprise Walsh codes.

34. The method of claim 32, wherein said first and second sets of orthogonal sequences of frequency-channel-associated weights comprise Fourier sequences.

35. The method of claim 32, wherein each of said frequency-channel-associated weights in the first and second sets incorporates a power level setting for each of said plurality of information signals.

36. The method of claim 35, wherein the relative power level ratio of one information signal to another is substantially equal in each of said plurality of frequency channels.

37. The method of claim 23, further comprising the steps of:

modulating one of either (a) the plurality of combined weighted information signals, or (b) the plurality spread-spectrum combined weighted information signals, with respective channel frequencies to develop a plurality of modulated information signals; and transmitting the plurality of modulated information signals across the CDMA communications system in each of the plurality of frequency channels.

* * * * *